(12) United States Patent
Yeon et al.

(10) Patent No.: US 11,824,417 B2
(45) Date of Patent: *Nov. 21, 2023

(54) ACTUATOR WITH MULTIPOLAR MAGNET STRUCTURE

(71) Applicant: JAHWA ELECTRONICS CO., LTD., Chungcheongbuk-do (KR)

(72) Inventors: Je Seung Yeon, Chungcheongbuk-do (KR); Jung Min Son, Incheon (KR); Hyo Jo Jeong, Chungcheongbuk-do (KR); Min Gyu Suh, Seoul (KR); Myung Gyun Son, Gyeongsangbuk-do (KR)

(73) Assignee: JAHWA ELECTRONICS CO., LTD., Chungcheongbuk-Do (KR)

( * ) Notice: Subject to any disclaimer, the term of this patent is extended or adjusted under 35 U.S.C. 154(b) by 211 days.

This patent is subject to a terminal disclaimer.

(21) Appl. No.: 17/137,841

(22) Filed: Dec. 30, 2020

(65) Prior Publication Data

US 2021/0119523 A1  Apr. 22, 2021

Related U.S. Application Data

(62) Division of application No. 16/237,906, filed on Jan. 2, 2019, now Pat. No. 10,938,290.

(30) Foreign Application Priority Data

Oct. 17, 2018 (KR) .......................... 10-2018-0123641

(51) Int. Cl.
*H02K 41/035* (2006.01)
*G02B 7/09* (2021.01)
(Continued)

(52) U.S. Cl.
CPC .............. *H02K 41/035* (2013.01); *G02B 7/09* (2013.01); *G03B 5/00* (2013.01); *G03B 13/36* (2013.01);
(Continued)

(58) Field of Classification Search
CPC ........ H02K 41/035; H02K 33/16; G02B 7/09; G02B 7/10; G03B 5/00; G03B 13/36;
(Continued)

(56) References Cited

U.S. PATENT DOCUMENTS

2005/0117469 A1* 6/2005 Song ................... G11B 7/0956
369/44.22
2017/0146889 A1* 5/2017 Bang ...................... G03B 13/36

FOREIGN PATENT DOCUMENTS

JP 2008233525 A * 10/2008
KR 10-2006-0017168 A 2/2006
KR 10-2018-0098463 A 9/2018

OTHER PUBLICATIONS

Office action dated Feb. 17, 2022 from Korean Patent Office in a counterpart Korean Patent Application No. 10-2021-0029702 (all the cited references are listed in this IDS.) (English translation is also submitted herewith.).

* cited by examiner

*Primary Examiner* — Alicia M Harrington
(74) *Attorney, Agent, or Firm* — The PL Law Group, PLLC

(57) ABSTRACT

An actuator with a multipolar magnet structure includes a carrier configured so that a lens is loaded thereon, the carrier being configured to linearly move along an optical axis direction, a housing configured to accommodate the carrier, a coil unit provided in the housing and having an n number of coils arranged along the optical axis direction in the same side of the housing, where n is a natural number of 2 or (Continued)

above, and a magnet mounted to the same side of the carrier to face the coil unit, the magnet having an n+1 number of magnetic poles facing the coil unit.

4 Claims, 5 Drawing Sheets

(51) Int. Cl.
    *G03B 5/00*     (2021.01)
    *G03B 13/36*     (2021.01)

(52) U.S. Cl.
    CPC ............... *G03B 2205/0046* (2013.01); *G03B 2205/0069* (2013.01); *H02K 41/0356* (2013.01)

(58) Field of Classification Search
    CPC .... G03B 2205/0046; G03B 2205/0069; G03B 2205/0007; H01F 7/081
    See application file for complete search history.

(A)

Prior Art

ACTUATOR WITH MULTIPOLAR MAGNET STRUCTURE

CROSS-REFERENCE TO RELATED APPLICATION AND CLAIM OF PRIORITY

This application is a divisional application of U.S. application Ser. No. 16/237,906, filed on Jan. 2, 2019, which claims priority to the benefit of Korean Patent Application No. 10-2018-0123641 filed in the Korean Intellectual Property Office on Oct. 17, 2018, the entire contents of which are incorporated herein by reference.

BACKGROUND

1. Technical Field

The present disclosure relates to an actuator for operating a lens, and more particular, to an actuator having a multipolar magnet structure mounted to a carrier having a lens.

2. Background Art

Along with the development of hardware techniques and the change of user environments or the like, various and complicated functions are integrally implemented at a portable terminal (or, a mobile terminal) or the like, in addition to a basic function for communication.

A representative example is a camera module having an auto focus (AF) function and an optical image stabilization (OIS) function. Also, a voice recognition function, a fingerprint recognition function, an iris recognition function or the like is recently loaded on a portable terminal for authentication or security.

Also, it is attempted to mount a zoom lens capable of changing a size or the like of a target variously by adjusting a focus distance variously by means of a zoom-in function and a zoom-out function.

Light of a target passing through the zoom lens is put into a photographing device such as a charge-coupled device (CCD) and a complementary metal-oxide semiconductor (CMOS), and image data is generated therefrom by means of following processing.

The zoom lens has a structure in which a plurality of lenses or lens groups are arranged coaxially along an optical axis direction, namely in a direction along which light is normally incident, and thus the length of the zoom lens is elongated in the optical axis direction, compared to a general lens. Also, a moving displacement of the zoom lens along the optical axis direction is relatively large for various adjustment of a focal distance.

Since the zoom lens has a large weight and volume and a great displacement (also referred to as a stroke), in order to improve the driving efficiency, as shown in (a) of FIG. 1, a plurality of facing coils 10 respectively facing the plurality of magnets 20 are mounted to a housing or the like that is a fixed body corresponding to the carrier 30. Here, the carrier 30 may move by a magnetic force generated between the plurality of facing coils 10. In this case, the driving force is dispersed in the vertical direction, and the driving force is advantageously increased.

Meanwhile, seeing the location relationship of the coil 10 and the magnet 20 as shown in (a) of FIG. 1, in a region S of the coil 10 parallel to the optical axis direction Z, a magnetic force orthogonal to the magnet 20 is generated. Thus, a driving force for moving the carrier 30 is not generated, and the driving force is generated in a region P perpendicular to the optical axis direction Z.

In a conventional example where a plurality of magnets 20 are provided, if the movement displacement of the carrier 30 is not large as shown in (b) of FIG. 1, the region P of the coil 10 faces the corresponding magnetic pole of the magnet 20, and thus a driving force may be applied. However, if the movement displacement of the carrier 30 becomes large as shown in (c) of FIG. 1, when, the region P of the coil 10 deviates from the range of the corresponding magnetic pole of the magnet 20, which is not suitable for the zoom operation having a great movement displacement (stroke).

In order to solve this problem, it is necessary to increase separate a gap D1 between the coils 10 and a gap D2 between the magnets, and a magnet 20 with a significantly large size should be mounted to the carrier 30.

Therefore, according to the conventional technology, a sufficient space should be secured between the magnet 20 and the coil 10 as much, which increases the volume of the actuator and the weight of the carrier, thereby lowering the driving efficiency. Further, since the plurality of magnets should be disposed at suitable intervals, the efficiency of the assembling process is also low.

SUMMARY

The present disclosure is designed to solve the problems of the related art, and therefore the present disclosure is directed to providing an actuator, which may further enhance the operation efficiency of a carrier by allowing a coil and a magnet to keep facing each other even though a moving distance of the carrier is increased, by using an improved magnetic pole structure of the magnet.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

In one aspect of the present disclosure, there is provided an actuator with a multipolar magnet structure, comprising: a carrier configured so that a lens is loaded thereon, the carrier being configured to linearly move along an optical axis direction; a housing configured to accommodate the carrier; a coil unit provided in the housing and having an n (n is a natural number of 2 or above) number of coils arranged along the optical axis direction in the same side of the housing; and a magnet mounted to the same side of the carrier to face the coil unit, the magnet having an n+1 number of magnetic poles facing the coil unit.

For example, the n number of coils of the present disclosure may include two coils composed of an upper coil and a lower coil, and the magnet may have three poles.

Also, the magnet of the present disclosure may include a common magnetic pole located at a center portion thereof and having any one of N pole and S pole; and an upper magnetic pole and a lower magnetic pole having a magnetic pole opposite to the common magnetic pole and respectively located above and below the common magnetic pole based on the optical axis direction.

Further, the common magnetic pole of the magnet of the present disclosure may face a lower part of the upper coil and an upper part of the lower coil simultaneously, the upper magnetic pole of the magnet may face an upper part of the upper coil, and the lower magnetic pole of the magnet may face a lower part of the lower coil.

In addition, a length of the common magnetic pole of the present disclosure along the optical axis direction may be longer than a length of the upper magnetic pole and lower magnetic pole along the optical axis direction.

For example, powers applied to the upper coil and the lower coil of the present disclosure may have opposite directions, and the magnet of the present disclosure implements six-polar magnetization.

Further, the actuator of the present disclosure may further comprise an optical module configured to reflect light of a target, which is incident from the outside, to the optical axis direction.

In addition, the n number of coils of the present disclosure may have a track shape including an upper part and a lower part in a direction perpendicular to the optical axis direction, and based on two adjacent coils among the n number of coils, a lower part of an upper coil located above based on the optical axis direction and an upper part of a lower coil located lower than the upper coil may face the same magnetic pole among the n+1 number of magnetic poles of the magnet.

According to an embodiment of the present disclosure, the driving force between the magnet and the coil may be enhanced, and simultaneously a single magnet may be mounted to the carrier, thereby improving the process efficiency.

Also, according to the present disclosure, the magnetic pole of the magnet facing the plurality of coils is improved to have a three-pole structure, and the length of the common electrode in the optical axis direction is relatively longer than that of the other electrodes. Thus, the present disclosure may be optimized for the zoom operation and the operation in which the movement displacement of the carrier is increased.

In addition, since the corresponding structure of the coil and the magnet may be further simplified, it is possible to further improve the design and space utilization of the actuator. Moreover, since the conventional extended gap space between the plurality of magnets is not required, the size of the magnet may be downsized, and thus the actuator may be designed in a smaller size more effectively.

BRIEF DESCRIPTION OF THE DRAWINGS

The accompanying drawings illustrate exemplary embodiments of the present disclosure and together with the foregoing disclosure, serve to provide further understanding of the technical features of the present disclosure, and thus, the present disclosure is not construed as being limited to the drawing.

DETAILED DESCRIPTION

Hereinafter, exemplary embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just examples for the purpose of illustrations only, not intended to limit the scope of the disclosure, so it should be understood that other equivalents and modifications could be made thereto without departing from the scope of the disclosure.

Figure 1:
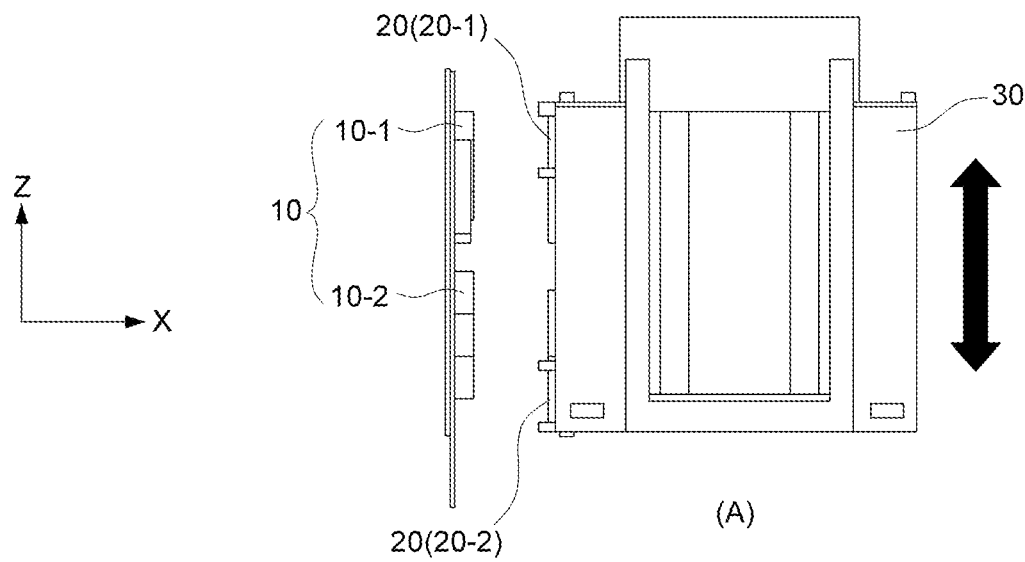
FIG. 1 is a diagram showing a zoom operation by a plurality of conventional magnets.
Figure 1:
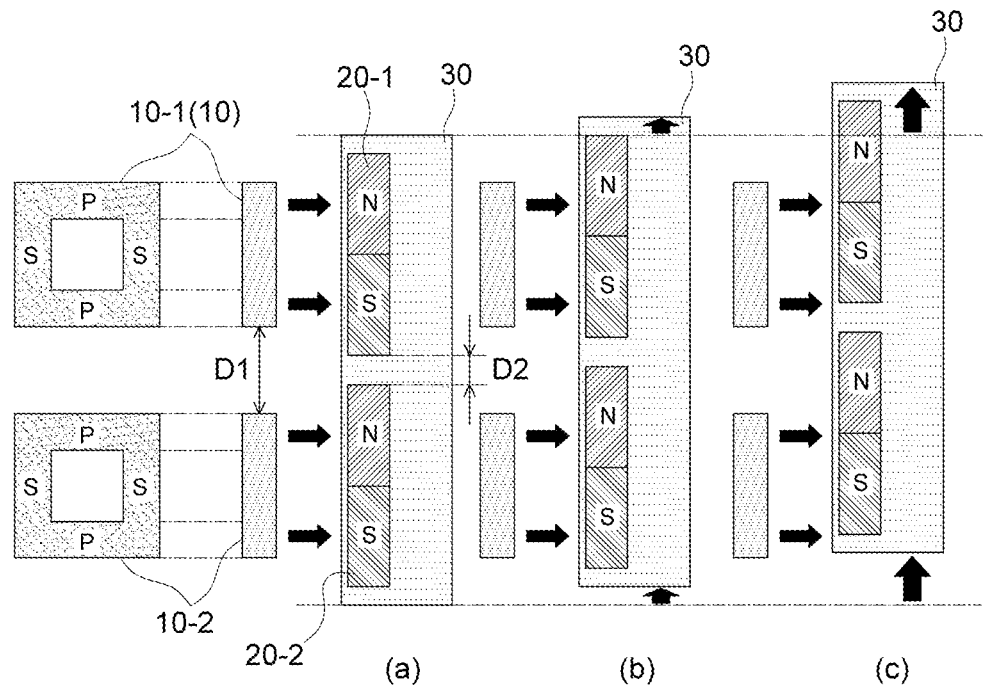
Figure 2:
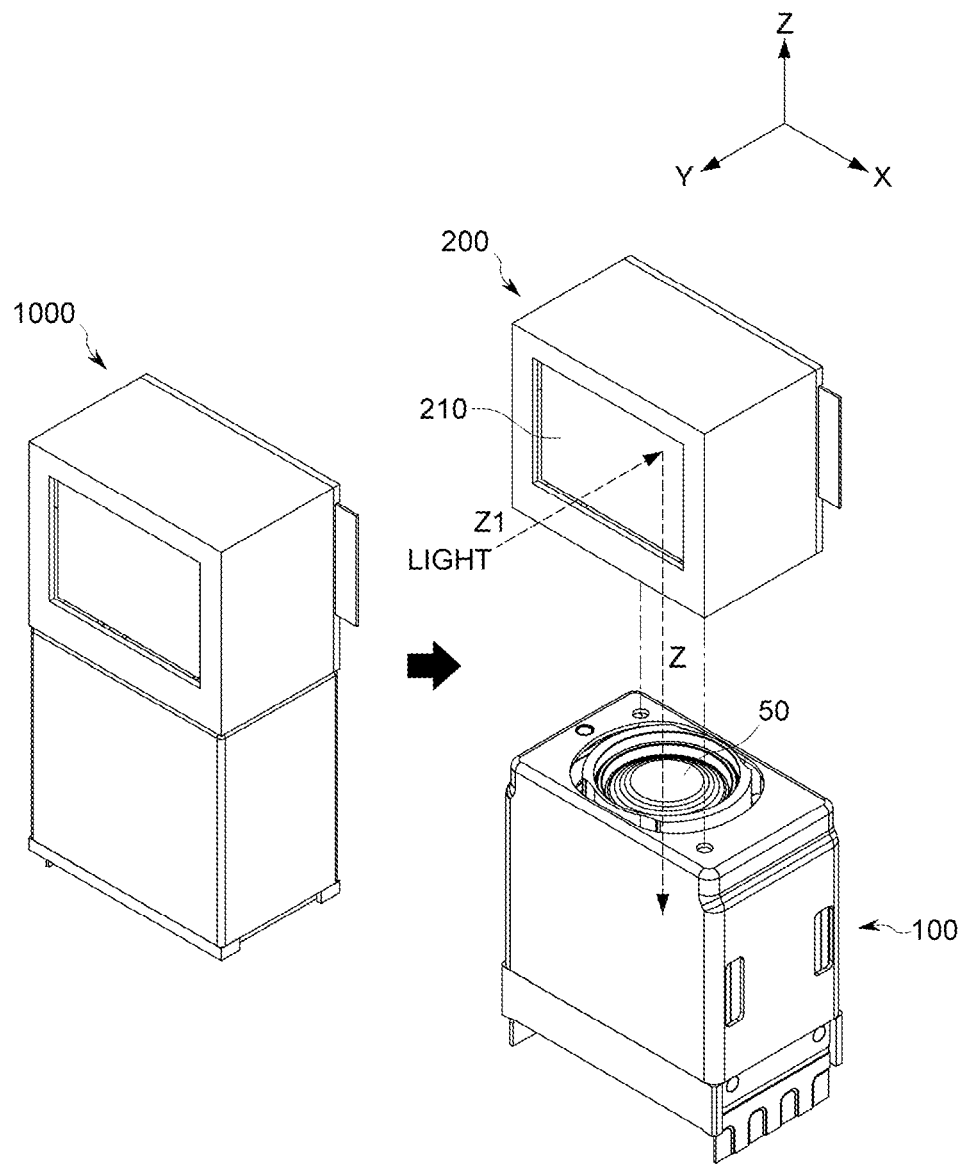
FIG. 2 is a diagram showing an overall configuration of an actuator according to an embodiment of the present disclosure.

FIG. 2 is a diagram showing an overall configuration of an actuator 100 with a multipolar magnet structure (hereinafter, referred to as an actuator) according to an embodiment of the present disclosure.

The actuator 100 of the present disclosure may be implemented as a single device in itself, and may also be implemented as an integrated actuator 1000 coupled to an optical module 200 as shown in FIG. 2.

The actuator 100 of the present disclosure may implement an auto focus (AF) function or a zoom function by linearly moving a carrier 110 (see FIG. 3 or the like), on which a lens 50 is loaded, in an optical axis direction.

Since the present disclosure is mainly applied to a case where a stroke is large, like zoom operation, a basic embodiment will be described based on the zoom operation, but the present disclosure may also be applied to other embodiments such as AF operation.

The optical module 200 functions to reflect or refract a light path Z1 of a target to a path Z along the lens direction. The light reflected or refracted to the optical axis direction Z as above passes through the lens 50 provided at the carrier and is then introduced into an imaging device (not shown) such as a CMOS or a CCD.

The optical module 200 for changing the path of light includes an optical system 210 which may be configured with any one of a mirror and a prism, or a combination thereof. The optical system 210 may be implemented using various members capable of changing the light incident from the outside into the optical axis direction. For example, the optical system 210 may be made of glass to improve the optical performance.

The integrated actuator 1000 of the present disclosure including the optical module 200 therein refracts the path of light so that the light enters the lens 50. Thus, the lens may be installed in the length direction of a portable terminal, rather than in the thickness direction thereof, which does not increase the thickness of the portable terminal. Thus, the portable terminal may be optimized for miniaturization or slimness.

According to an embodiment, the optical system 210 may be configured to be rotationally moved by a driving means that generates a magnetic force such as a magnet and a coil. If the optical system 210 moves or rotates in a clockwise or counterclockwise direction with respect to the YZ plane, the light of the target reflected (refracted) through the optical system 210 moves in the +Y direction or the −Y direction to enter the imaging device or the lens. Thus, this mechanism may be applied for the image stabilization in the Y-axis direction.

Figure 3:
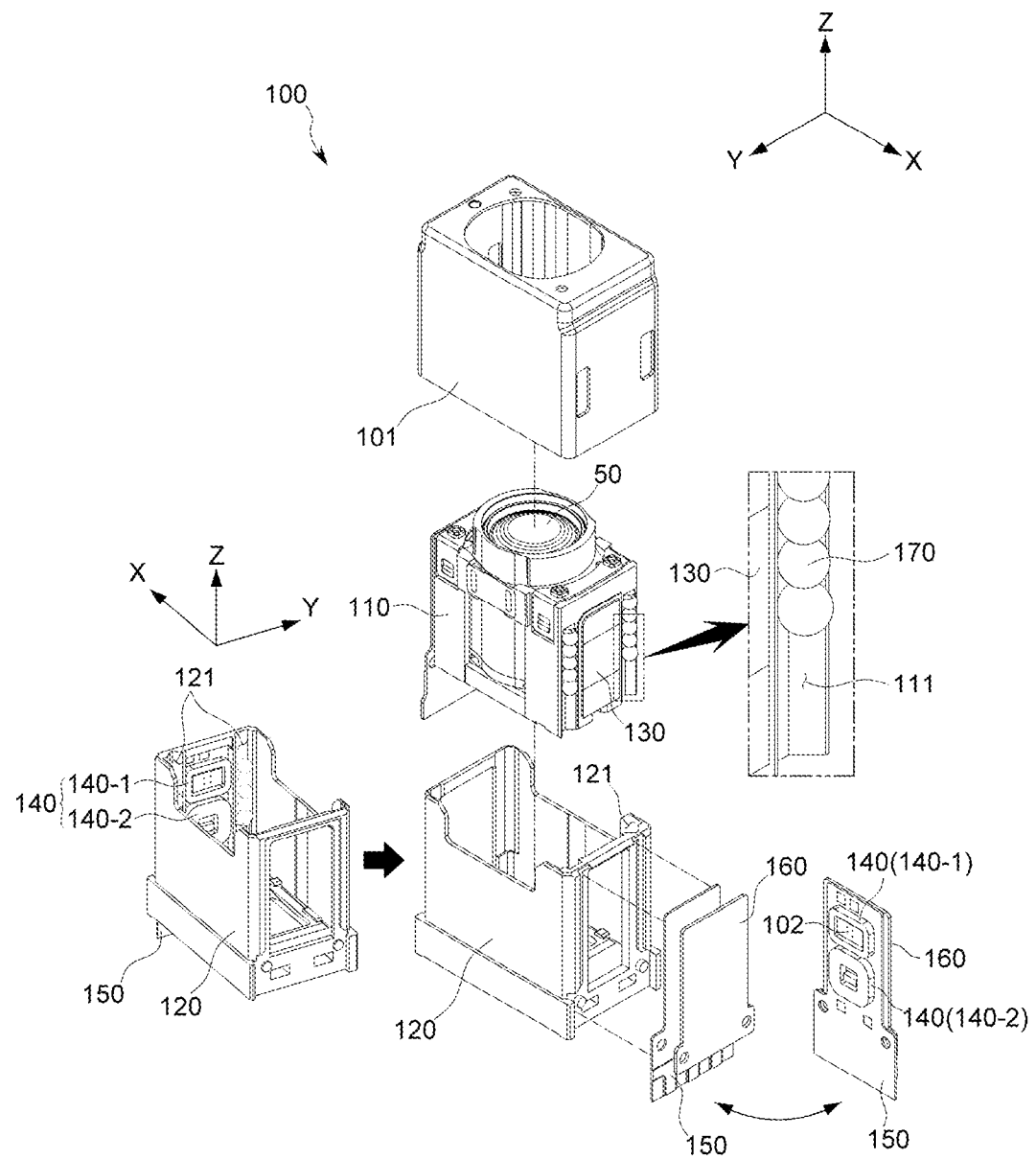
FIG. 3 is an exploded perspective view showing a detail configuration of the actuator according to an embodiment of the present disclosure.

FIG. 3 is an exploded perspective view showing a detail configuration of the actuator 100 according to an embodiment of the present disclosure. As shown in FIG. 3, the actuator 100 of the present disclosure includes a case 101, a lens 50, a carrier 110 and a housing 120.

The carrier 110 of the present disclosure linearly moves in the Z direction of the optical axis. Since the lens 50 is loaded on the carrier 110, the loaded lens 50 also moves linearly in the optical axis direction due to the linear movement of the carrier 110.

The housing 120 gives a space for accommodating the carrier 110. If the carrier 110 is a moving object, the housing 120 corresponds to a fixed body. As is well known, the carrier 130 serving as a moving object includes a magnet 130, and the housing 120 corresponding to a fixed body or a fixed body corresponding thereto includes a coil unit 140 facing the magnet 130.

The carrier 110 of the present disclosure is an object moving by the magnetic force between the magnet 130 and the coil unit 140. Since the magnetic force between the magnet 130 and the coil unit 140 has an interactive relationship, in another embodiment, it is also possible that the carrier 110 includes the coil unit 140 and the housing 120 serving as a fixed body includes the magnet 130.

However, in order to increase the efficiency of the structural design, wiring line, and the like, the carrier 130 serving as a moving object may include the magnet 130 and the coil unit 140 is provided at the housing 120 serving as a fixed body so as to be mounted to a circuit board 150.

A plurality of balls 170 may be provided between the carrier 110 and the housing 120 of the present disclosure. As the plurality of balls 170 are disposed between the carrier 110 and the housing 120, the carrier 110 may move based on the housing 120 with minimal friction due to moving, rolling and point-contacting of the balls. Thus, it is possible to reduce noise, minimize the driving force, and improve the driving precision.

In order to keep a suitable distance between the housing 120 and the carrier 110 and to more effectively guide the linear movement of the carrier 110, as shown in FIG. 3, the balls 170 may be provided to be partially accommodated in guide rails 111, 121 formed on at least one of the carrier 110 and the housing 120.

Though it is depicted in the figures that the guide rails 111, 121 have a groove form extending in the Z-axis direction (the optical axis direction), this is just an embodiment, and the guide rails 111, 121 may be implemented in various forms capable of preventing deviation of the balls 170 and guiding the movement of the balls 170.

In addition, in order to improve the driving force and the efficiency of the linear movement, a portion of the first guide rail 111, which is a guide rail provided at the carrier 110, and a portion of the second guide rail 121, which is a guide rail provided at the housing 120, may have V-shaped cross sections, and the other guide rails may have U-shaped cross sections.

A yoke 160 of the present disclosure is disposed to face the magnet 130 with the ball 170 being interposed therebetween. The yoke 160 generates an attraction force to the magnet 130 provided at the carrier 110 to prevent the carrier 110 having the magnet 130 from being separated from the housing 120. Also, the yoke 160 allows not only a point contact between the carrier 110 and the ball 170 but also a point contact between the housing 120 and the ball 170 to be effectively maintained.

A hall sensor for detecting a position of the carrier 110, specifically a position of the magnet 130 or a sensing magnet (not shown) provided at the carrier 110, by means of a hall effect, or an operating driver 102 having the hall sensor, may be further provided so that the movement of the carrier 110 in the optical axis direction may be implemented more precisely.

The operating driver 102 may control the position of carrier, namely the lens 50 mounted to the carrier 110, more precisely by using the signal outputted from the hall sensor and the characteristic (magnitude and direction) of the power applied to the coil unit 140 together as a feedback control.

As shown in FIG. 3, the coil unit 140 of the present disclosure includes an n (n is a natural number of 2 or above) number of coils 140-1, 140-2 arranged along optical axis direction.

From the corresponding viewpoint, the magnet 130 of the present disclosure is configured to have an n+1 number of magnetic poles at a side or direction facing the coil unit 140 as described below.

Hereinafter, the relationship between the n number of coil units 140 and the magnet 130 having an n+1 number of magnetic poles will be described in detail with reference to FIG. 4 and the like.

Figure 4:
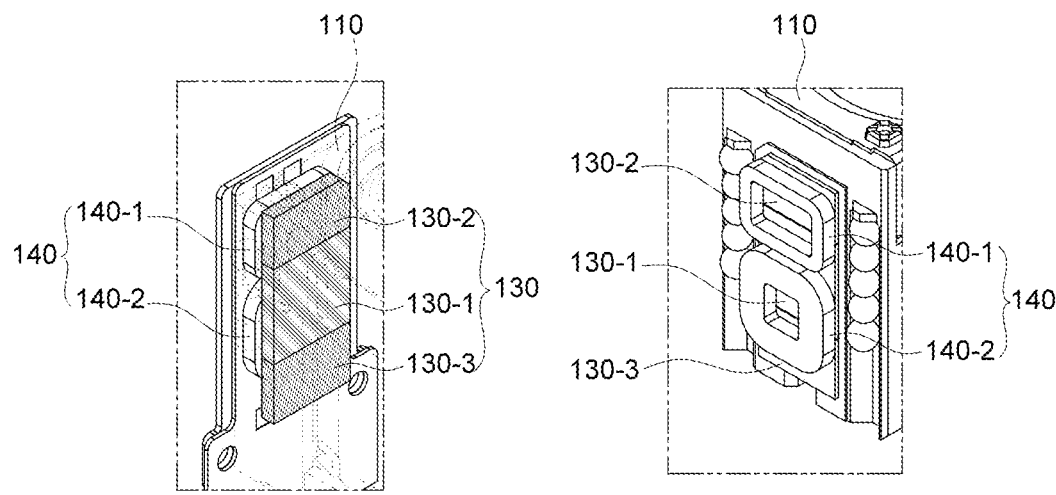
FIG. 4 is a diagram showing the arrangement of the coil and the magnet of the present disclosure, depicted in FIG. 3.
Figure 5:
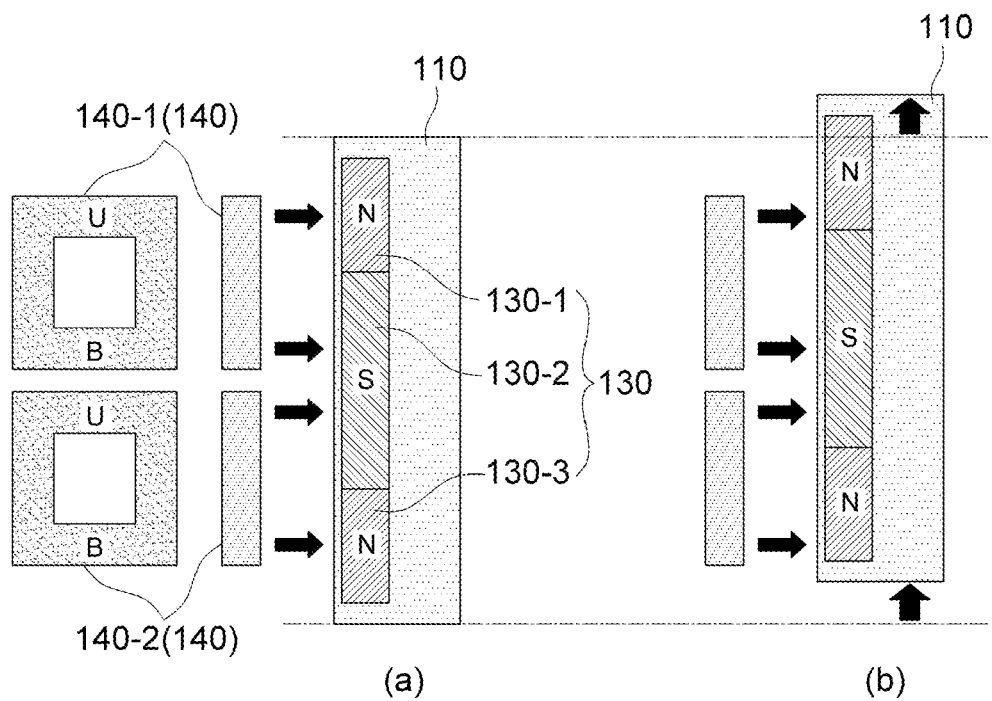
FIG. 5 is a diagram showing a relationship between the coil and the magnet according to an embodiment of the present disclosure.

FIG. 4 is a diagram showing the arrangement of the coil unit 140 and the magnet 130 of the present disclosure, depicted in FIG. 3, and FIG. 5 is a diagram showing a relationship between the coil unit 140 and the magnet 130 according to an embodiment of the present disclosure.

FIG. 4 and the like show an embodiment in which the coil unit 140 includes 2 (n=2) coils and the magnet 130 facing the coil unit 140 has 3 (2+1) magnetic poles.

The coils 140-1, 140-2 of the coil unit 140 is provided in a wound form and thus has a so-called track shape. In the relationship with the magnet 130, a driving force is generated in a region perpendicular to the optical axis direction as described above.

In the following description, in the track shape of the coils 140-1, 140-2, an upper region (based on the optical axis direction) of the two regions perpendicular to the optical axis direction is referred to as an upper part U (see FIG. 5), and a lower region is referred to as a lower part B (see FIG. 5).

Also, in the coil unit 140, the coil located at an upper portion based on FIG. 4 is referred to as an upper coil 140-1, and the coil located at a lower portion is referred to as a lower coil 140-2.

The magnet 130 of the present disclosure is disposed to face the coil unit 140, specifically all of the upper coil 140-1 and the lower coil 140-2, and as shown in FIG. 4, the surface of the magnet 130 facing the coil unit 140 has three magnetic poles.

Specifically, the magnet 130 of the present disclosure includes a common magnetic pole 130-1 located at the center of the magnetic pole 130-1 and having one of an N pole and an S pole, an upper magnetic pole 130-2 located above the common magnetic pole 130-1, and a lower magnetic pole 130-3 located below the common magnetic pole 130-1.

The upper magnetic pole 130-2 and the lower magnetic pole 130-3 of the present disclosure have the same magnetic pole, which is opposite to the magnetic pole of the common magnetic pole 130-1.

As shown in FIG. 5, the lower part B of the upper coil 140-1 and the upper part U of the lower coil 140-2 are configured to face the common magnetic pole 130-1 of the magnet 130. Also, the upper part U of the upper coil 140-1 is disposed to face the upper magnetic pole 130-2, and the lower part B of the lower coil 140-2 is disposed to face the lower magnetic pole 130-3.

That is, based on two adjacent coils among the n number of coils, the lower part of the upper coil located higher based on optical axis direction and the upper part of the lower coil located lower than the upper coil are disposed to simultaneously face the same magnetic pole among the n+1 number of magnetic poles of the magnet.

If the number of coils and the number of magnetic poles of the magnet increase, coils and magnetic poles of magnet are further arranged up and down based on the optical axis direction, in addition to the above configuration.

For example, if the number of coils is 3 (n=3), the number of magnetic poles of the magnet 130 becomes 4. Here, the upper part of an uppermost coil (a first coil based on the optical axis direction) is disposed to face an uppermost magnetic pole (for example, N pole) of the magnet 130, and the lower part of the uppermost coil is disposed to face a second common magnetic pole (for example, S pole) of the magnet 130 together with the upper part of a middle coil (a second coil).

According to this arrangement sequence, the lower part of the middle coil is disposed to face a third common magnetic pole (for example, N pole) of the magnet 130 together with the upper part of a lowermost coil (a third coil), and finally the lower part of the lowermost coil (the third coil) is disposed to face a fourth magnetic pole (for example, S pole) of the magnet 130.

Based on two adjacent coils among the n number of coils, the powers respectively applied to the upper coil 140-1 located above based on the optical axis direction and the lower coil 140-2 located lower than the upper coil have opposite directions. In other words, if the power applied to one coil has the clockwise direction, the power applied to the other coil has the counterclockwise direction.

If the coils 140 and the magnet 130 are configured as described above, the magnet 130 may be realized as a single object, and thus the actuator may be assembled and manufactured in a simpler way. In addition, even though the movement of the carrier 110 is increased as shown in the portion (b) of FIG. 5, compared to the portion (a) of FIG. 5, each magnetic pole of the magnet 130 and the facing region of the corresponding coil unit 140 may be continuously maintained, and thus it is possible to effectively overcome the conventional problem that the driving force is broken.

In addition, if the magnet 130 is configured as shown in FIG. 5, it is possible to adaptively design the size and arrangement of the actuator 100 according to the size and space of the actuator 100, thereby more effectively securing the space utilization of the actuator 100. Moreover, since the region in which the magnetic force acts between the magnet 130 and the coils 140 may be expanded, it is possible to enhance the driving force for the movement of the carrier 110.

Figure 6:
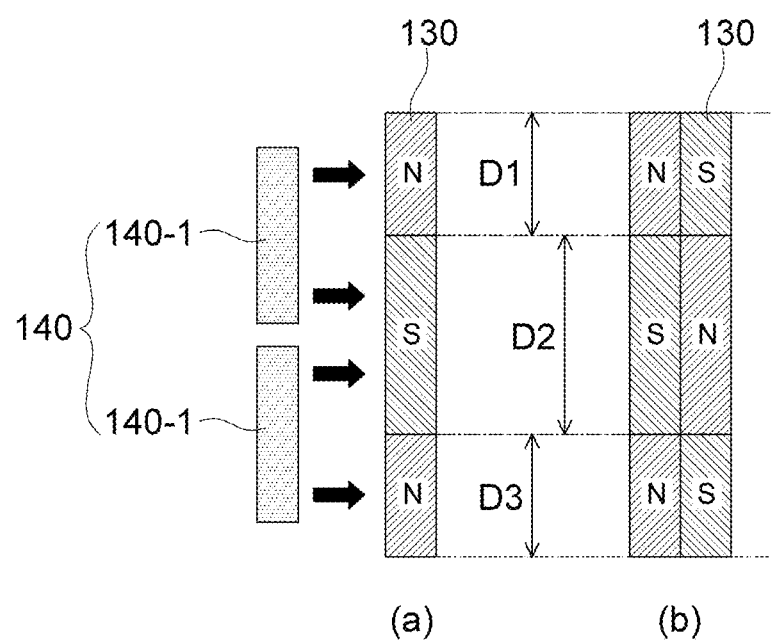
FIG. 6 is a diagram showing a magnet according to an embodiment of the present disclosure.

FIG. 6 is a diagram showing the magnet 130 according to an embodiment of the present disclosure.

As shown in the portion (a) of FIG. 6, the common magnetic pole 130-1 of the magnet 130 faces the lower part B of the upper coil 140-1 and the upper part U of the lower coil 140-2 simultaneously. Thus, the length D2 of the common magnetic pole 130-1 of the magnet 130 may be greater than the length D1, D3 of the upper magnetic pole 130-2 and the lower magnetic pole 130-3 of the magnet 130 (based on the optical axis direction) so that the facing region may be maintained even though the carrier 110 moves in the optical axis direction.

In addition, though the upper coil 140-1 and the lower coil 140-2 have different sizes according to embodiments, the region sizes of the common magnetic pole 130-1, the upper magnetic pole 130-2 and the lower magnetic pole 130-3 of the magnet 130 may be varied within the range in which the above feature of the present disclosure is maintained.

As described above, according to the present disclosure, it is not necessary to use a plurality of individual magnets, different from the prior art, and it is not necessary to separate the individual magnets sufficiently from each other. Thus, based on the same space, a magnet having a larger magnetic force may be applied, and thus the driving efficiency may be improved.

If three magnetic poles may face the coil 140 as shown in the portion (a) of FIG. 6, the magnet 130 of the present disclosure may be configured to implement three-pole magnetization, and may also be configured to implement six-pole magnetization for more efficient magnetization as shown in the portion (b) of FIG. 6.

The present disclosure has been described in detail. However, it should be understood that the detailed description and specific examples, while indicating exemplary embodiments of the disclosure, are given by way of illustration only, since various changes and modifications within the scope of the disclosure will become apparent to those skilled in the art from this detailed description.

In the above description of this specification, the terms such as "first", "second", "upper" and "lower" are merely conceptual terms used to relatively identify components from each other, and thus they should not be interpreted as terms used to denote a particular order, priority or the like.

The drawings for illustrating the present disclosure and its embodiments may be shown in somewhat exaggerated form in order to emphasize or highlight the technical contents of the present disclosure, but it should be understood that various modifications may be made by those skilled in the art in consideration of the above description and the illustrations of the drawings without departing from the scope of the present invention.

What is claimed is:

1. An actuator with a multipolar magnet structure, comprising:
    a carrier configured so that a lens is loaded thereon, the carrier being configured to linearly move along an optical axis direction;
    a housing configured to accommodate the carrier;
    a coil unit provided in the housing and having an n number of coils arranged along the optical axis direction in the same side of the housing, where n is a natural number of 2 or above; and
    a magnet mounted to the same side of the carrier to face the coil unit, the magnet having an n+1 number of magnetic poles facing the coil unit, wherein the n+1 number of magnetic poles are arranged along the optical axis, and
    wherein the magnet comprises;
    a common magnetic pole located at a center portion thereof and having any one of N pole and S pole; and
    an upper magnetic pole and a lower magnetic pole having a magnetic pole opposite to the common magnetic pole and respectively located above and below the common magnetic pole based on the optical axis direction,
    wherein a length of the common magnetic pole along the optical axis direction is longer than a length of the upper magnetic pole and a length of the lower magnetic pole along the optical axis direction.

2. The actuator of claim 1, wherein the common magnetic pole of the magnet faces a lower part of an upper coil and an upper part of a lower coil simultaneously;

and the upper magnetic pole of the magnet faces an upper part of the upper coil, and the lower magnetic pole of the magnet faces a lower part of the lower coil.

3. The actuator of claim 1, wherein powers applied to an upper coil and a lower coil have opposite directions.

4. The actuator of claim 1, wherein the magnet implements six-polar magnetization.

\* \* \* \* \*